United States Patent [19]

Finkel

[11] 4,135,004
[45] Jan. 16, 1979

[54] METHOD OF MAKING A TOASTER POTATO PRODUCT

[76] Inventor: Gilbert Finkel, 6 Jagged Rock Rd., Parsippany, N.J. 07054

[21] Appl. No.: 687,877

[22] Filed: May 19, 1976

[51] Int. Cl.$^2$ .................................................. A23L 1/00
[52] U.S. Cl. .................................... 426/550; 426/438; 426/637
[58] Field of Search ............... 426/637, 549, 438, 466, 426/808, 550; D1/21

[56] References Cited

U.S. PATENT DOCUMENTS

| | | | |
|---|---|---|---|
| D. 239,215 | 3/1976 | Miller | D1/21 |
| 3,027,258 | 3/1962 | Markakis et al. | 426/438 |
| 3,493,390 | 2/1970 | Succo | 426/637 |
| 3,597,227 | 8/1971 | Murray et al. | 426/637 |
| 3,800,050 | 3/1974 | Popel | 426/550 |
| 3,849,582 | 11/1974 | Blagdon | 426/550 |

*Primary Examiner*—Raymond N. Jones
*Assistant Examiner*—Elizabeth A. Hatcher
*Attorney, Agent, or Firm*—Pennie & Edmonds

[57] ABSTRACT

A frozen toaster French fried potato product made from a dough comprising a potato base, water, oil, and a high-amylose product, the oil and high amylose product being present in an amount sufficient to give controlled oil absorption, to give shape retention during frying, and to prevent any significant exudation of oil from said product when toasted, and the method of making such product as hereinafter described.

3 Claims, No Drawings
}

METHOD OF MAKING A TOASTER POTATO PRODUCT

BACKGROUND OF THE INVENTION

Partially or wholly cooked potato products, in various shapes, are available commercially. A common type are frozen fried potato products, such as French fries and puffs, which are meant to be cooked to completion or reheated for consumption either by frying in oil or by being baked in an oven. These fried products are prepared by either slicing whole potatoes to the shape desired, partially or wholly cooking by frying in oil, and freezing, or by forming potato granules, flakes, mixtures thereof, or combinations thereof with comminuted raw potato into a potato dough which is then shaped into the form desired, fried in oil, and then frozen.

Such frozen products, however, are not entirely satisfactory in that they tend to exude oil when cooked to completion by baking. In addition, those products made by reconstituting heat-treated potatoes, such as potato flakes and granules, lack the desired potato flavor and texture.

The exudation or dripping of oil from these products has precluded their being toasted in a toaster to effect reheating for consumption which would make them truly convenient. The dripping of oil not only damages the toaster and is a fire hazard as well as creating an unsightly and unsanitary condition, but makes the product too "greasy". Thus, it has not been possible heretofore to make toaster "French fried" potato products; products partially or wholly cooked by frying, frozen, and then cooked to completion or reheated in a conventional toaster to give final products having the taste of conventional French fried potato products.

SUMMARY OF THE INVENTION

A toaster French fried potato product has now been found which can be reheated in a toaster which overcomes the problems of oil exudation upon toasting and which has excellent texture and flavor.

Briefly stated, the present invention comprises a dough adapted for forming into fried potato products comprising a potato base, water, oil, and a high amylose product, the oil and amylose product being present in an amount sufficient to give controlled oil absorption; to give shape retention during frying, and to prevent any significant exudation of oil from said product when toasted. The invention also comprises the method of making such product as hereinafter described.

DETAILED DESCRIPTION

As used herein, the term "toaster French fried potato product" is meant to include any frozen, prefried potato-based product which can be reheated for consumption by being toasted and which, upon completion of such cooking, will have substantially the taste and texture of a French fried potato product. The product, of course, can be any shape desired, but it is preferred to have the product in the shape of French fried potatoes in the form of a series of connected links as depicted in U.S. Design applications Ser. Nos. 600,634 and 665,083, filed July 31, 1975, and Mar. 8, 1976, respectively. When separated from the connected series, the individual links resemble conventional French fries.

In the instant invention, it is essential that the product contain a potato base; namely, comminuted raw potatoes, dehydrated potato granules, or potato flakes, or mixtures thereof with the preferred material from a taste viewpoint being comminuted raw potatoes. If comminuted raw potato solids are used, they should not be more than about 55% by weight of the potato solids in the formulation. The remainder of the necessary potato solids can be supplied by the dehydrated potato flakes or granules. This limit on the amount of raw potato solids is due to their high moisture content which would raise the mash moisture above that necessary to have a suitable product.

A second essential component is a high amylose product. Examples of such are the amylose products resulting from the fractionation of whole starch into its respective amylose and amylopectin components, or to whole starch which is composed of at least 55%, by weight, of amylose. The amylose may be further treated as with heat and/or acids or with oxidizing agent to form so called thin boiling products. Or, the amylose may be chemically derivatized, as by means of an esterification reaction which would thus yield amylose esters such, for example, as the acetate, propionate, and butyrate; or, by means of an etherification reaction which would thus yield amylose ethers such, for example, as the hydroxyethyl, hydroxypropyl, carboxymethyl or benzyl.

The further essential component is oil. As used herein, the term "oil" is meant to include both liquid and solid fats conventionally used in preparing frozen fried foods. The final frozen product should contain no more than about 15% by weight of oil, and preferably about 8 to 14% by weight. However, as will be described hereinafter, it is important in making the product that a certain proportion of the oil be admixed with the dough prior to frying. Any of the oils conventionally used to make fried products can be used, with vegetable oils, such as cottonseed, peanut, and soy oil, being preferred.

The remaining components are water and can include the usual seasoning ingredients such as salt, pepper, and the like, as well as antioxidants and chelating agents which are added to give the final products their effect. In some instances, it may be desired to add flavorings, such as cheese, tomatoes, and the like and these can be added in their usual amounts and for their usual taste effects.

As to proportions, the dough (or mash) formed before frying should have the following percentage range of ingredients:

|  | % by Weight |
| --- | --- |
| Potato Particles | 25-35 |
| High Amylose Product | 2-10 |
| Oil | 2-15 |
| Water | 55-65 |

The fried product which is frozen should have the following percentages:

|  | % by Weight |
| --- | --- |
| Potato Particles | 30-40 |
| High Amylose Product | 2-10 |
| Oil | 8-15 |
| Water | 45-50 |

It is essential in preparing the product that there be a particular sequence of steps in order to ensure that the product, when toasted, will have the taste and appearance of French fried potato products and will not exude oil upon toasting.

The initial step of the process comprises separately forming two mixtures; a slurry of the amylose product and the water and a mixture of the potato base material and the oil together with any seasonings, flavorings, or the like desired to be included in the formula. The starch slurry and the oil mixture are then mixed together with vigorous agitation to form a dough having the oil and amylose product dispersed substantially uniformly therethrough.

The dough is then heated to a temperature sufficient to keep the oil in liquid form; namely, about 120° F., during the shaping of the product into the form desired prior to freezing. It is preferred to shape the product by molding, particularly into the shapes shown in the aforenoted design applications, although it is, of course, possible to extrude the dough into the shape desired. If molded, the molds should also preferably be kept at a temperature of about 120° F.

The need for this sequence of steps and proportion of oil and amylose product in the dough is to give controlled oil absorption during the subsequent step of frying of the shaped dough to a self-sustaining form before freezing, to give shape retention during frying, as well as to prevent the exudation of oil during toasting to reheat the product before it is eaten. It is believed that the high amylose product forms a film about the oil in the potato product and this prevents the exuding of any oil therefrom during subsequent toasting. The film need not be continuous, but only substantially so. Moreover, it is essential that the proportions of oil and amylose product in the dough be within the ranges set forth in order to obtain the effects noted. Amounts of oil above that noted results in a porous, sponge-like fried product with too high a level of oil and an oil level in the dough below that listed makes the product too pasty. As to the amylose product, a level in the dough below that indicated results in oil drippage from the fried product during frying and also during frying the shaped dough will tend to expand, or balloon, and thus become distorted in shape. An amount of amylose product above that specified can limit oil absorption during frying as well as make the product too moist upon reheating by toasting.

There is a specific relationship, or synergistic effect, between the oil and amylose product in the dough. Measured by organoleptic methods, the effect on retention of shape during frying of doughs containing oil and amylose product in the ranges set forth above is on the order of three times better than the effect of doughs containing only the amylose product and equal to the effect of doughs containing only the oil. As to controlled oil absorption, the effect on "greasiness" after frying is on the order of twice the level of oil content used alone in the dough prior to frying and equal to the effect of the use of amylose product alone in the dough.

In any event, the frying of the product results in absorption of only about enough oil to raise the total in the finished product from 8 to 15% while reducing the moisture level to about 45 to 50%.

The cooked product is then frozen by any conventional method and stored until desired to be eaten. At that time, it is simply placed into a toaster, toasted until heated, and is ready to be eaten.

This invention will be further described in connection with the following example of the practice of it which is given for purposes of illustration only.

EXAMPLE 1

A potato dough was from the following constituents:

|  | % by Weight |
| --- | --- |
| Dehydrated Potato Flakes | 28.46 |
| High Amylose Product (Amylomaize) | 4.74 |
| Vegetable Oil | 3.42 |
| Water | 61.67 |
| Salt | 1.71 |
|  | 100.00 |

The Amylomaize and water were formed into a slurry and, separately, the potato flakes, salt, and oil were thoroughly admixed. The oil mixture and slurry were then thoroughly blended with agitation to form a dough in which the oil and Amylomaize were substantially uniformly dispersed.

The dough temperature was then elevated to 120° F. and the dough molded into a number of shaped strips comprising several interconnected rods shaped to resemble French fried potatoes. The size and shape of the strips was such that they fit into conventional toasters. The mold was also maintained at a temperature of 120° F. during molding.

The shaped strips were then fried in a conventional fryer containing peanut oil until cooked at which point the shaped strips were self-supporting. The fried products had a lower water content, 45% to 50%, and a higher oil content, 8% to 15%.

The fried products were then frozen and kept frozen until desired to be eaten. At that time they were prepared for eating simply by being placed in a toaster and toasted. There was no dripping of oil during toasting and when toasting was completed, the toasted product had the taste and the texture of conventional fried potatoes.

It will be understood that the high amylose product referred to and used in the instant invention is in addition to the amylose present in the potato and in making the product.

Of the high amylose starches, such as those obtained from potato, corn, tapioca, rice and the like, it is preferred to use the high amylose starch from corn and most preferred is amylose acetate prepared by reacting acetic anhydride with high amylose corn starch having an amylose content of 55%, by weight.

While the invention has been described in connection with preferred embodiments, it is not intended to limit the invention to the particular forms set forth, but on the contrary, it is intended to cover such alternatives, modifications, and equivalents as may be included within the spirit and scope of the invention as defined by the appended claims.

What is claimed is:

1. The method of making a frozen toaster French fried potato product comprising forming a slurry comprising a high amylose product selected from amylose resulting from the fractionation of whole starch; whole starch containing at least 55% by weight of amylose; amylose treated with heat, or acid, or oxidizing agent to form a thin boiling; an amylose ester; or an amylose ether and water, separately forming a mixture comprising oil and potato particles, admixing said slurry and said mixture to form a dough having the oil and high-amylose product dispersed substantially uniformly therethrough, and consisting essentially of for each 100 parts by weight thereof:

|                      | Parts by Weight |
|----------------------|-----------------|
| Potato particles     | 22–35           |
| High amylose product | 2–10            |
| Oil                  | 2–15            |
| Water                | 55–65           | heating the dough to a temperature of about 120° F., shaping the dough to the shape desired while at said temperature, frying the shaped dough for a time sufficient to cook the shaped dough, and freezing the cooked dough.

2. The method of claim 1 wherein the potato is selected from comminuted raw potato, dehydrated potato flakes, dehydrated potato granules, or mixtures thereof, the oil is a vegetable oil, and the high amylose product is the acetate ester of a high amylose corn starch.

3. The method of claim 2 wherein the potato is a combination of comminuted raw potato and dehydrated potato flakes in which the comminuted raw potato is used in an amount up to about 55% by weight of the potato solids.

* * * * *